(12) United States Patent
Pullara et al.

(10) Patent No.: US 7,409,420 B2
(45) Date of Patent: Aug. 5, 2008

(54) METHOD AND APPARATUS FOR SESSION REPLICATION AND FAILOVER

(75) Inventors: Sam Pullara, San Francisco, CA (US); Eric M. Halpern, San Francisco, CA (US); Prasad Peddada, Albany, CA (US); Adam Messinger, San Francisco, CA (US); Dean Bernard Jacobs, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 493 days.

(21) Appl. No.: 10/000,708

(22) Filed: Oct. 31, 2001

(65) Prior Publication Data

US 2003/0014480 A1 Jan. 16, 2003

Related U.S. Application Data

(60) Provisional application No. 60/305,992, filed on Jul. 16, 2001.

(51) Int. Cl.
*G06F 15/16* (2006.01)
(52) U.S. Cl. .................. 709/203; 709/230; 709/231; 370/352
(58) Field of Classification Search .............. 709/213, 709/227, 203, 231, 230; 370/352
See application file for complete search history.

(56) References Cited

U.S. PATENT DOCUMENTS

| 4,714,996 | A | 12/1987 | Gladney et al. |
|---|---|---|---|
| 5,163,148 | A | 11/1992 | Walls |
| 5,612,865 | A | 3/1997 | Dasgupta ................ 364/184 |
| 5,613,060 | A | 3/1997 | Britton et al. |
| 5,634,052 | A | 5/1997 | Morris |
| 5,748,882 | A | 5/1998 | Huang |
| 5,765,171 | A | 6/1998 | Gehani et al. |
| 5,774,689 | A | 6/1998 | Curtis et al. |
| 5,796,934 | A | * | 8/1998 | Bhanot et al. ................ 714/4 |
| 5,805,798 | A | 9/1998 | Kearns et al. |
| 5,813,017 | A | 9/1998 | Morris |
| 5,819,107 | A | 10/1998 | Lichtman et al. |
| 5,828,847 | A | 10/1998 | Gehr et al. ............ 395/200.69 |

(Continued)

OTHER PUBLICATIONS

Stearns, "Using the J2EE Connector Architecture Common Client Interface", Sun MicroSystems Inc. , Apr. 2001, pp. 1-10.

(Continued)

*Primary Examiner*—Jason Cardone
*Assistant Examiner*—Adnan M Mirza
(74) *Attorney, Agent, or Firm*—Fliesler Meyer LLP

(57) ABSTRACT

A session replication system provides real-time data replication without unnecessarily slowing down the user experience. A system in accordance with the present invention may utilize a primary server to serve requests from a network client, as well as a secondary server to replicate the session information. When a request is received on the session, an attempt may be made to serve the request on the primary server. If the primary is unable to receive or respond to the request, the request may be served on the secondary application server or on a new primary server. If the secondary server receives the request, the secondary server may become the new primary server. If a new primary server is selected, the new primary may request the session information from the secondary server.

43 Claims, 8 Drawing Sheets

U.S. PATENT DOCUMENTS

| | | | |
|---|---|---|---|
| 5,909,689 A | 6/1999 | VanRyzin | |
| 5,910,180 A | 6/1999 | Flory et al. | |
| 5,926,775 A | 7/1999 | Brumley et al. | |
| 5,951,694 A | 9/1999 | Choquier et al. | 714/15 |
| 5,991,804 A | 11/1999 | Bolosky | 709/221 |
| 6,018,805 A | 1/2000 | Ma et al. | |
| 6,055,243 A | 4/2000 | Vincent et al. | |
| 6,065,046 A | 5/2000 | Feinberg et al. | |
| 6,122,629 A | 9/2000 | Walker et al. | |
| 6,134,673 A * | 10/2000 | Chrabaszcz | 714/13 |
| 6,163,801 A * | 12/2000 | O'Donnell et al. | 709/213 |
| 6,173,293 B1 | 1/2001 | Thekkath et al. | |
| 6,173,327 B1 | 1/2001 | De Borst et al. | |
| 6,185,601 B1 | 2/2001 | Wolff | |
| 6,189,046 B1 | 2/2001 | Moore et al. | |
| 6,195,680 B1 * | 2/2001 | Goldszmidt et al. | 709/203 |
| 6,199,110 B1 | 3/2001 | Rizvi et al. | 709/227 |
| 6,212,521 B1 | 4/2001 | Minami et al. | |
| 6,212,556 B1 | 4/2001 | Arunachalam | |
| 6,243,753 B1 | 6/2001 | Machin et al. | |
| 6,256,634 B1 | 7/2001 | Moshaiov et al. | |
| 6,269,373 B1 | 7/2001 | Apte et al. | |
| 6,301,589 B1 | 10/2001 | Hirashima et al. | 707/204 |
| 6,304,879 B1 | 10/2001 | Sobeski et al. | |
| 6,366,930 B1 | 4/2002 | Parker et al. | |
| 6,389,462 B1 | 5/2002 | Cohen et al. | |
| 6,393,495 B1 | 5/2002 | Lurndal | 709/203 |
| 6,401,239 B1 | 6/2002 | Miron | |
| 6,405,219 B2 | 6/2002 | Saether et al. | |
| 6,411,956 B1 | 6/2002 | Ng | |
| 6,425,005 B1 | 7/2002 | Dugan et al. | |
| 6,430,564 B1 | 8/2002 | Judge et al. | |
| 6,438,705 B1 | 8/2002 | Chao et al. | |
| 6,453,321 B1 | 9/2002 | Hill et al. | |
| 6,453,356 B1 | 9/2002 | Sheard et al. | |
| 6,466,972 B1 | 10/2002 | Paul et al. | |
| 6,484,204 B1 | 11/2002 | Rabinovich | 709/226 |
| 6,490,610 B1 | 12/2002 | Rizvi | 709/101 |
| 6,505,200 B1 | 1/2003 | Ims et al. | 707/8 |
| 6,505,241 B2 | 1/2003 | Pitts | |
| 6,523,130 B1 | 2/2003 | Hickman et al. | |
| 6,526,521 B1 * | 2/2003 | Lim | 714/4 |
| 6,539,381 B1 | 3/2003 | Prasad et al. | 707/10 |
| 6,542,845 B1 | 4/2003 | Grucci et al. | |
| 6,578,160 B1 * | 6/2003 | MacHardy et al. | 714/43 |
| 6,609,213 B1 | 8/2003 | Nguyen et al. | |
| 6,651,140 B1 | 11/2003 | Kumar | |
| 6,721,777 B1 | 4/2004 | Sharma | |
| 6,757,708 B1 | 6/2004 | Craig et al. | 709/203 |
| 6,766,361 B1 | 7/2004 | Venigalla | |
| 6,775,703 B1 | 8/2004 | Burns et al. | |
| 6,779,017 B1 | 8/2004 | Lamberton et al. | |
| 6,826,601 B2 | 11/2004 | Jacobs et al. | |
| 6,832,238 B1 | 12/2004 | Sharma et al. | |
| 6,836,889 B1 | 12/2004 | Chan et al. | |
| 6,877,111 B2 * | 4/2005 | Sharma et al. | 714/13 |
| 6,898,587 B2 | 5/2005 | Messinger | |
| 6,918,013 B2 | 7/2005 | Jacobs et al. | |
| 6,944,785 B2 | 9/2005 | Gadir et al. | |
| 6,957,254 B1 | 10/2005 | Iterum et al. | |
| 6,963,857 B1 | 11/2005 | Johnson | |
| 7,000,019 B2 | 2/2006 | Low et al. | |
| 7,028,030 B2 | 4/2006 | Jacobs et al. | |
| 7,065,616 B2 | 6/2006 | Gajjar et al. | |
| 7,085,834 B2 * | 8/2006 | Delany et al. | 709/225 |
| 7,089,584 B1 | 8/2006 | Sharma | |
| 7,100,195 B1 | 8/2006 | Underwood | |
| 7,107,543 B2 | 9/2006 | Berry et al. | |
| 7,127,713 B2 | 10/2006 | Davis et al. | |
| 7,171,692 B1 | 1/2007 | DeMello et al. | |
| 7,240,101 B2 | 7/2007 | Rich et al. | |
| 7,254,634 B1 | 8/2007 | Davis et al. | |
| 2001/0049717 A1 | 12/2001 | Freeman et al. | |
| 2001/0054062 A1 | 12/2001 | Ismael et al. | |
| 2002/0004850 A1 | 1/2002 | Sudarshan et al. | |
| 2002/0073188 A1 | 6/2002 | Rawson, II | |
| 2002/0073354 A1 * | 6/2002 | Schroiff et al. | 714/4 |
| 2002/0091832 A1 | 7/2002 | Low et al. | |
| 2002/0107934 A1 | 8/2002 | Lowery et al. | |
| 2002/0116474 A1 | 8/2002 | Copeland et al. | |
| 2002/0147652 A1 | 10/2002 | Gheith et al. | |
| 2002/0147961 A1 | 10/2002 | Charters et al. | |
| 2002/0161839 A1 | 10/2002 | Colasurdo et al. | |
| 2002/0184444 A1 | 12/2002 | Shandony | |
| 2002/0188591 A1 | 12/2002 | Santosuosso | |
| 2003/0014480 A1 | 1/2003 | Pullara et al. | |
| 2003/0018732 A1 | 1/2003 | Jacobs et al. | |
| 2003/0041135 A1 | 2/2003 | Keyes et al. | |
| 2003/0046442 A1 | 3/2003 | Maryka et al. | |
| 2003/0060214 A1 | 3/2003 | Hendrey et al. | |
| 2003/0065686 A1 * | 4/2003 | Callahan et al. | 707/200 |
| 2003/0065826 A1 | 4/2003 | Skufca et al. | |
| 2003/0074580 A1 | 4/2003 | Knouse et al. | |
| 2003/0088713 A1 | 5/2003 | Mandal et al. | |
| 2003/0105837 A1 | 6/2003 | Kamen et al. | |
| 2003/0110467 A1 | 6/2003 | Balakrishnan | |
| 2003/0115366 A1 | 6/2003 | Robinson | |
| 2003/0233433 A1 | 12/2003 | Halpern et al. | |
| 2003/0236923 A1 | 12/2003 | Jeyaraman et al. | |
| 2004/0059735 A1 | 3/2004 | Gold et al. | |
| 2004/0139125 A1 | 7/2004 | Strassburg et al. | |
| 2004/0153558 A1 | 8/2004 | Gunduce et al. | |
| 2004/0230747 A1 | 11/2004 | Ims et al. | |
| 2006/0143239 A1 | 6/2006 | Battat et al. | |
| 2006/0168118 A1 | 7/2006 | Godlin et al. | |
| 2006/0212453 A1 | 9/2006 | Eshel et al. | |

OTHER PUBLICATIONS

Marinescu, "BEA Webogic Server 6.1 has been released", TheServerSide.com, Jul. 31, 2001, p. 1.

Flowers, "The J2EE Connector Architecture", Sys-Con Media, May 1, 2001, pp. 1-4.

Rana et al., "Java Junction", Intelligent Enterprise, Apr. 16, 2001, pp. 1-9.

Stanhope, "J2EE Connector Architecture Promises to Simplify Connection to Back-End Systems", Giga Information Group, Nov. 16, 2000, pp. 1-4.

Sarathy, et al., "Integrating Java Applications with the Enterprise", EAI Journal, May 2001, pp. 50-55.

BEA Systems, Inc., WebLogic Server 6.1, Sep. 19, 2001, 36 pages.

Rodoni, "The J2EE Connector Architecture's Resources Adapter", Sun MicroSystems Inc., Dec. 2001, pp. 1-12.

BEA Systems Inc., WebLogic Server 6.1, Sep. 15, 2001, 26 pages.

Visveswaran, "Dive Into Connection Pooling With J2EE", Sun MicroSystems Inc., Oct. 2000, pp. 1-7.

Gamma, et al., "Design Patterns Elements of Reusable Object-Oriented Software", Addison-Wesley Publishing Company, 1995, pp. 293-303.

Sun Microsystems, "Enterprise JavaBeans Specification, Version 2.0", 2 pages, Aug. 14, 2001.

BEA Systems, "Connection Management", WebLogic Server 6.1, 2001, 3 pages.

Bainbridge, "CICS and Enterprise JavaBeans", 2001, v. 40, No. 1, p. 1-19.

Kooijmans, Enterprise JavaBeans for z/OZ and OS/390 WebSphere Application Server V4.0; 2001; pp. 31-78, 185-240.

* cited by examiner

METHOD AND APPARATUS FOR SESSION REPLICATION AND FAILOVER

CLAIM OF PRIORITY

This application claims priority to U.S. Provisional patent application No. 60/305,992, filed Jul. 16, 2001, entitled METHOD AND APPARATUS FOR SERVLET SESSION REPLICATION AND FAILOVER, incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to data replication and specifically to providing redundancy for a client network session.

BACKGROUND

When a client connects to a server on a network and begins a session, there can be information stored on the server that is particular to that client session. For example, a user of the client might place items in a virtual shopping cart. The selection of those items can be stored, at least temporarily, on the server. In this example, there is no need for other users or servers to have access to this information. It is desirable, however, that this data be highly available across a network or server cluster such that if the server storing the session data fails, it is possible to recover the data on another server.

One way to accomplish data recovery in such a situation is to store the information in a database during the session, although the information could also be stored by other means such as in a data file. Every time a change is made to the session data, an update is written to the database such that the data is accessible to every server having access to the database. The data is stored in a persistent place, and can easily be retrieved by another server.

A problem exists with this approach, however, in that it is fairly expensive to fetch session information from the database for each request. The multiple hits to the database can create a bottleneck and bog the system down to the point where it is basically inoperable, as the throughput of the system can depend on the number of database connections from the server. Also, these sessions may contain the type of information, to which users want quick access. With some applications, it is possible for there to be thousands of clients working simultaneously, resulting in thousands of concurrent sessions. Some servers are expected to host many different applications, which further increases the number of sessions that may need to be hosted.

It is desirable to improve the speed and efficiency of such a system so that these tens of thousands of users may use the system effectively. One way to avoid such a bottleneck is to assume that the servers will be up and running 99.9% of the time and simply neglect to backup any information. This may be the solution providing the fastest user experience, but even 0.1% downtime resulting in data loss is unacceptable to many users.

BRIEF SUMMARY

Systems in accordance with the present invention can utilize a primary server to serve requests from a network client such as a web browser. The primary server can be selected from a pool of servers or server cluster. Once a primary server is selected, a client request can be served on that primary. A secondary session server can then be chosen, such as by the primary server. Once the primary server responds to the request, the information relating to the session is sent from the primary server to the secondary session server. This can be a full set of information for a first request on a session, or can simply be an update to existing information in a session in response to subsequent requests. Information identifying the primary and secondary servers can be stored on the client, such as a "token" that is stored as a cookie or passed on top of standard RMI in a manner similar to a transaction or security context. This identification information or "token" can accompany each request.

A system can take advantage of load balancing using either hardware or software. In a process useful with software load balancing, a request may be received on a session for which a primary and secondary session server have already been selected. An attempt is made to serve the request on the primary server. If the primary is unable to receive or respond to the request, the request can be served on the secondary application server. If the secondary server receives the request, the secondary server becomes the new primary server. A new secondary server can be selected and sent the session information from the new primary server in order to maintain redundancy.

In a process useful with a hardware load balancer, a request is received on a session for which a primary and secondary session server have been selected. An attempt is then made to serve the request on the primary server. If the primary server is unable to receive or respond to the request, the hardware load balancer can select a new primary server and attempt to serve the request on the new primary server, instead of using the secondary session server. The session information can be sent from the secondary session server to the new primary server, such as in response to a request from the new primary. The new primary server can then respond to the request, and send updated session information to the secondary server, so that the servers are in sync with regard to that session.

DETAILED DESCRIPTION

The present invention overcomes many of the deficiencies of prior art replication systems. In one system in accordance with an embodiment of the present invention, a session is created when a client makes a request to a server on a network, such as a local area network (LAN), ethernet, or Internet. The session server receiving the request can consist of any server that may be used to store information for a session and/or generate a response to a session request, such as for example an application server, a web server, an object server, or a servlet engine. The server ultimately receiving the request becomes the "primary" server, or the server to which the client will send future requests. The system can then choose a "secondary" server for that session, which acts as a source for redundancy.

Each time an update is made in that session, the change may not only be stored on the primary server, but can also be sent, such as by remote call, to the secondary server. The entire set of session data need not be forwarded to the secondary server each time a change is made, but only that data or information that has changed, such as can be sent in a delta or packet of information. Sending the minimum amount of necessary information in the delta can improve overall system efficiency. The replication acts like a mirroring system, except for the fact that it acts on session data. This mirroring can be done, in one example, for web applications using a servlet engine.

When a client connects to a server, a session object can be created that is associated with the client or user. The session object can be maintained on the primary server for the duration of the session or can be timed out after a specified period of time. Each session object can be given a unique identifier or identification number to identify the client and/or object to the server. The server chosen to serve the request can act as the primary server for the duration of the session. The primary server can choose a secondary server for the session object, such that each time the object is updated the update is also stored on the secondary server. The secondary server can be optimized to receive only minimum information or to batch updates, in order to improve the efficiency of the system.

Figure 1:
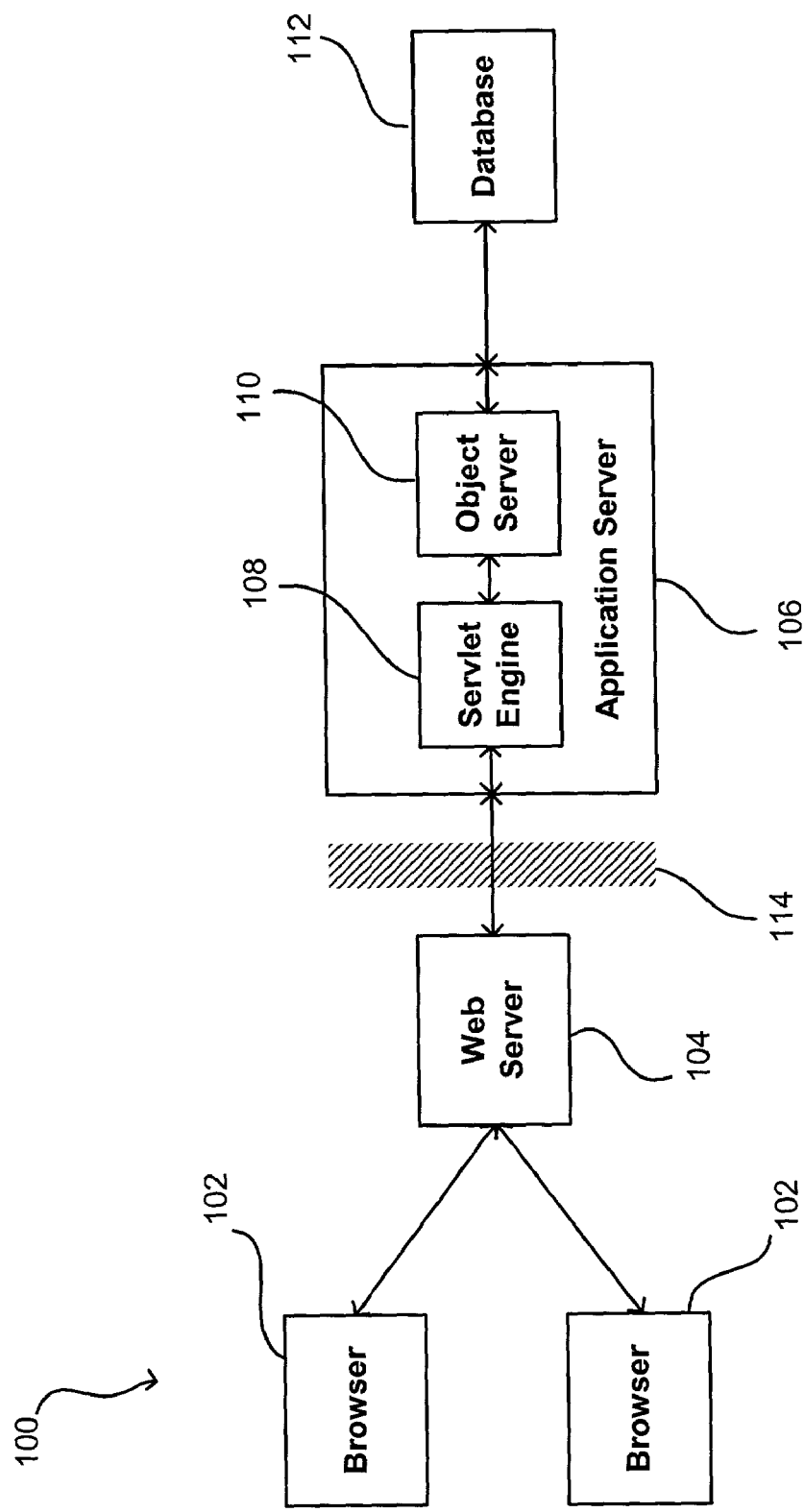
FIG. 1 is a diagram of an application server system in accordance with one embodiment of the present invention.

One web-based system 100 in accordance with an embodiment of the present invention is shown in FIG. 1. In this system, a browser 102, or client, makes a request that is received by a web server 104. The web server 104 acts as a proxy, in that the web server looks at the request and determines which of the object servers 110 should receive the request. The web server can have a plug-in, or plug-in API, that is aware of the request. A plug-in is generally an object that is added to an application in order to provide additional functionality without the need to launching any external applications. The plug-in can make a load-balancing decision in order to choose between the object servers 110 which are available to create and house the session for the client 102. The web server 104 proxies back to the chosen object server 110, which can be housed in an application server 106. A servlet engine 108 in the application server 106 can execute servlets that invoke objects on the object server 110 in order to respond to the request. In order to fully respond to the request, the object server 110 may also need to pull information from a database 112 or data store. The object server 110 can create the session upon receiving the request. In order to provide security, the application server 106 and database can be located behind a firewall 114, as is known and used in the art.

The object server in this example then chooses a secondary server for the session. In an alternative embodiment, the plug-in can be used to choose a secondary server. The plug-in can also use load balancing for the decision.

The object server passes the data to the secondary server, and lets the secondary server know it will be the backup. The object server then creates a cookie to be sent to, and stored by, the client. The cookie contains an identification of the primary and secondary servers used forte session.

When a subsequent request is sent by the client on the same session, it does not matter which web server receives the request. The web server will look at the cookie to determine the primary server for that session, and will then route the request to that primary server.

Figure 3:
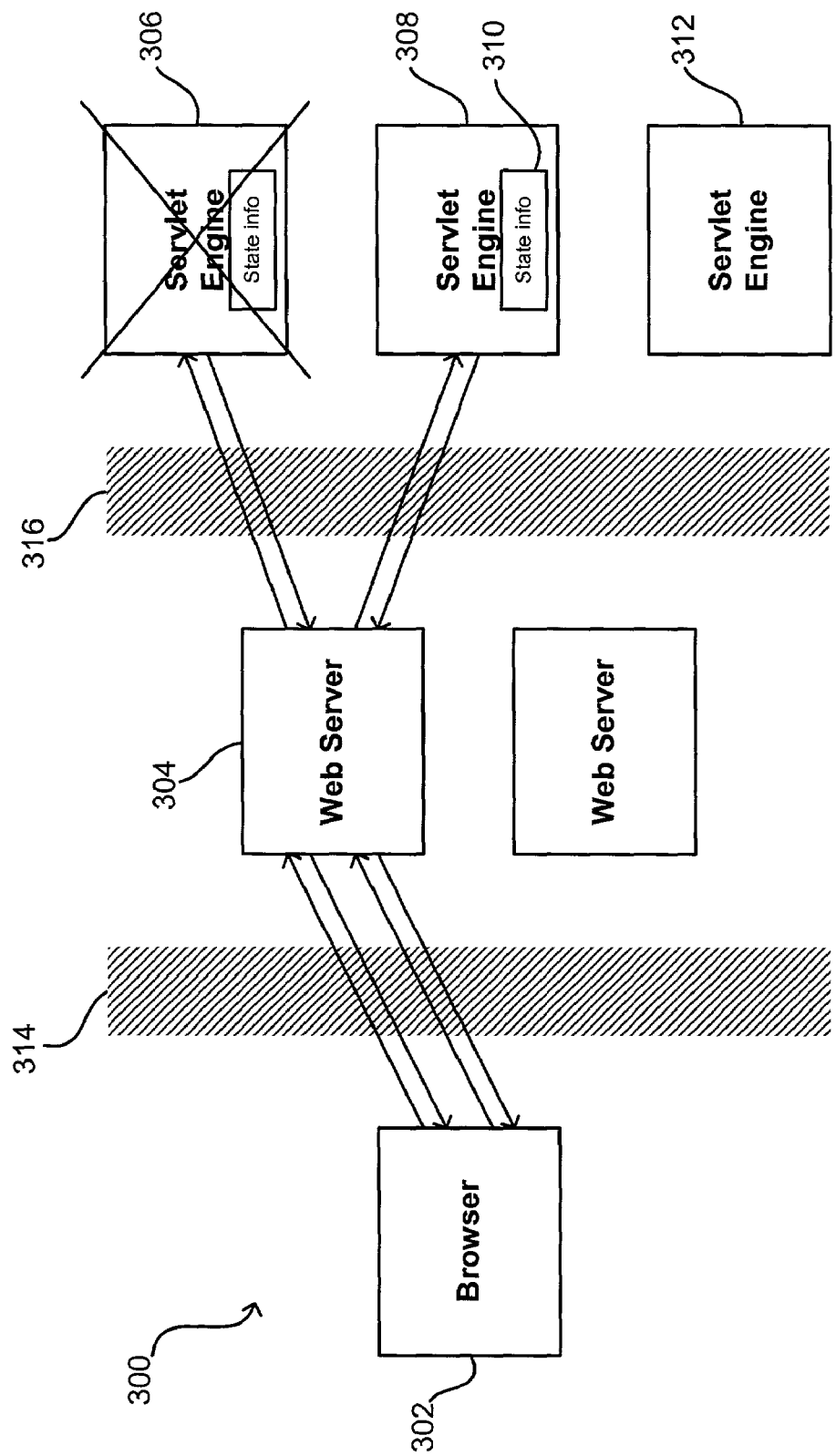
FIG. 3 is a diagram of a servlet engine system in accordance with one embodiment of the present invention.

Assume an example, as shown in FIG. 3, with three servlet engines 306, 308, and 312, each being capable of acting as a primary server. If the session is current on primary server 306, but primary server 306 fails, the web server 304 can determine which server was chosen as the secondary server by examining the cookie information sent with the request from the browser 302. The web server can then try to route the request to secondary server 308, which also contains the session state information 310. The web server can return a response to the browser 302, which will make another request that can be directed by the web server 304 to the secondary server 308. If secondary server 308 receives the request, it can become the new primary server automatically, as secondary server 308 knows it only receives a request directly from the web server if the primary server 306 fails to accept the request. At this point, secondary server 308, now the primary server 308, can choose new secondary server 312. Alternatively, the plug-in to the web server 304 can choose new secondary server 312. One possible place for a communication breakdown is shown by a first virtual boundary 314, which exists between the browser/client 302 and the web servers 304. A second virtual boundary exists between the web servers 304 and the servlet engines 306, 308, and 312.

In some embodiments, the secondary server or web server actively monitors the primary server in order to determine the status of the primary server. This monitoring can be done by any appropriate manner, such as by continually or periodically "pinging" the primary server to determine whether it is connected to the network. If it is determined that the primary server is unable to accept requests, the secondary server can become the new primary server. A new secondary server can then be selected. One advantage of such a design is that the window of time in which a dual server failure could result in session state loss is narrowed. While some embodiments allow the window to be defined by the client request rate, this approach would allow the window to be defined by the rate of server pinging.

The new primary and secondary servers are similarly responsible for information pertaining to the session. The server that was previously the primary server may no longer have any responsibility or information for that session, even if that server becomes able to accept and process requests while the session is still current. The secondary server may automatically change its state, such that it becomes the new primary server for the session, but it may choose not to assign a new secondary server until the new primary server receives a request.

It may be undesirable to actively create a new secondary server or backup the session information on a secondary server, as it may not be known whether the new primary server will receive another request. Creating a new secondary server or backing up information that will not get used can unnecessarily waste resources. The session may alternatively be short lived, and may not "live" long enough to receive a subsequent request. Each session typically has a time-out value, such that if the session is inactive for a specified period of time it will "time-out" or "die", the session will be ended, and all data stored for the session may be deleted to conserve memory. In such a case, not only might the creation of a secondary server waste resources, but it may also require unnecessary "clean-up" work to remove the session information from the new secondary server.

The primary and/or secondary server can be chosen according to an algorithm, which may have as options, for example, any server in a specified server cluster. While it may be efficient for an algorithm to choose the primary and secondary server for each session, there are cases where the input of an administrator may be desirable. For instance, it may be possible that multiple servers are located on one machine. If an algorithm is choosing servers, such as an algorithm based on load, the algorithm may select two servers on the same machine. In the event of a machine failure, both servers may be unavailable and the session data may be unavailable and/or lost. An administrator, however, can choose to specify primary and secondary servers that are on different machines. This can provide for redundancy not only across servers, but across machines as well.

Alternatively, it may be possible to build a parameter in the algorithm itself that, when doing a load-balancing analysis, takes into account the machine on which a server is located. If the server with the lowest current load is on the same machine as the primary server, the algorithm can choose to go to the server with the lowest load that is on a different machine. This approach can be expanded to any level of separation, such as servers in different rooms, different buildings, or different cities.

In order to allow servers in a cluster to function independently, the servers can be loosely coupled. To achieve this loose coupling, each server in the cluster can be configured to detect the status of other cluster servers such that action can be taken when a server leaves the cluster, either voluntarily or involuntarily. In one embodiment, servers can rely on the underlying operating system to monitor the status of the cluster servers. Other embodiments can require the servers to do monitoring. Embodiments where cluster servers do not have to participate in cluster monitoring may be preferred, as the servers' resources are available to improve the overall throughput of the system.

Figure 2:
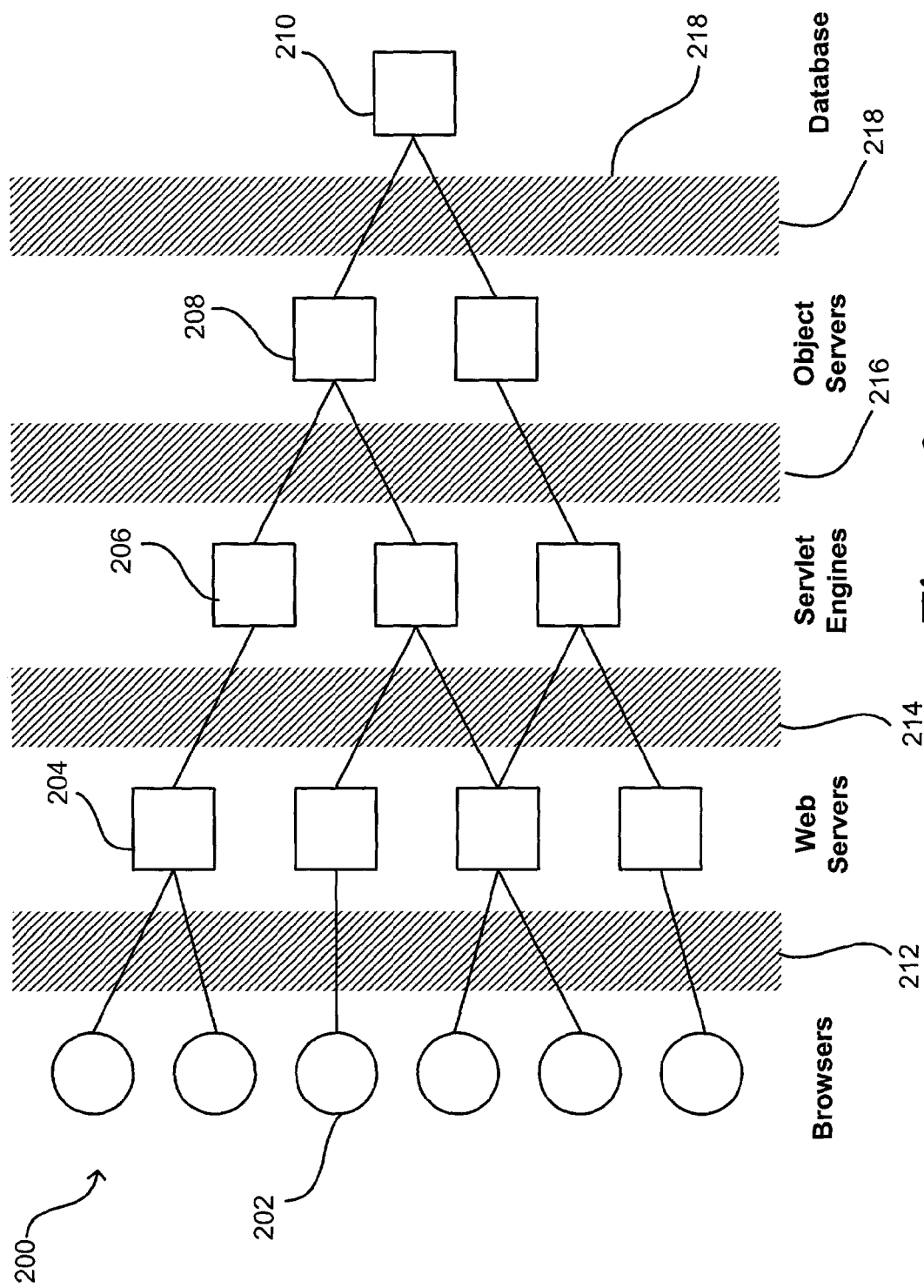
FIG. 2 is a diagram of a multi-level architecture in accordance with one embodiment of the present invention.

FIG. 2 shows a multi-tier cluster architecture 200 in accordance with the present invention. Each object in the system can be clustered by making instances of the object available on several servers. The architecture is shown to include virtual boundaries. The term "virtual boundary" refers to a place where a network connection may fail.

In FIG. 2, the first virtual boundary 212 is shown between the browsers 202 and the web servers 204. A second barrier 214 is shown between the web servers 204 and the servlet engines 206. A third barrier 216 is shown between the servlet engines 206 and the object servers 208. Finally, a fourth barrier 218 is shown between the object servers 208 and the database 210. Each barrier indicates a possible point for communication failure, that may also be able to take advantage of load balancing.

At the first virtual barrier, it is possible that a browser may not be able to get to a specific web server. This may not be a problem in a system in accordance with the present invention, however, because the information relating to the primary and secondary servers may already be stored in a cookie in the browser. The browser can contact any web server on the network, because the browser can indicate to the web server, through the cookie, which server should receive the request.

While the system may be most efficient on a local area network (LAN), a similar approach can be used on any capable network. For instance, it may be possible for the browser to contact a second web server and/or backend servers over the Internet that might be located in separate buildings from the first web server.

Depending on the application, the primary and secondary servers can be of several different server types, such as web servers, servlet engines, or Enterprise Java bean ("ejb") engines. It may still be possible for each server in a cluster to be separate and specialized, such as being of different server types, but still be capable of acting as a primary and/or secondary server.

If clustering is enabled on a system in accordance with the present invention, it may be possible to transparently add new servers to the system to act as additional primary and secondary servers. Clustering is, generally, an approach to server management that allows management of a set of servers by establishing a "managing" server in that set of servers. This approach can simplify the deployment and synchronization of potentially diverse components among the servers in the cluster. Clustering can substantially improve system reliability and scalability.

When clustering with a system in accordance with the present invention, each server in a cluster can be configured to detect a new server entering the cluster and designate that new server as a secondary server to any existing primary server. The method used for load balancing may can immediately designate the new server as a primary or secondary server.

Systems in accordance with the present invention may alternatively utilize a hardware load balancer to direct incoming requests. In an Internet setting, for example, a hardware load balancer can sit on the network with an IP (Internet Protocol) address. Incoming requests from browsers or clients can be directed to that IP address. The hardware load balancer can then redirect those requests to other IP addresses, or other servers each assigned an IP address, located in the system but "behind" the hardware load balancer. In this way, it appears to the browser as if the request is always going to the same IP address, when in fact it may be going to multiple servers behind that IP address. The hardware load balancer can be aware of all servers located behind it in the network, such as may be the result of hard wiring the servers to the hardware load balancer, instead of utilizing another method such as software clustering.

There may be advantages to using a hardware load balancer. A hardware load balancer can utilize better algorithms for load balancing than other approaches. The hardware load balancer may be able to detect node failures, so that those nodes may be pulled out of the list of servers available to the algorithm. This node removal can prevent the algorithm from trying to go to servers that may not be reachable, even though those particular servers might not yet have been sent a request.

A system in accordance with the present invention can also use a Domain Name System (DNS) protocol, such as DNS Round Robin, instead of using a hardware load balancer to map a domain name to several IP addresses, or to redirect requests sent to a web server to several object servers. DNS, however, does not typically determine or detect whether those IP addresses are actually "live".

Figure 4:
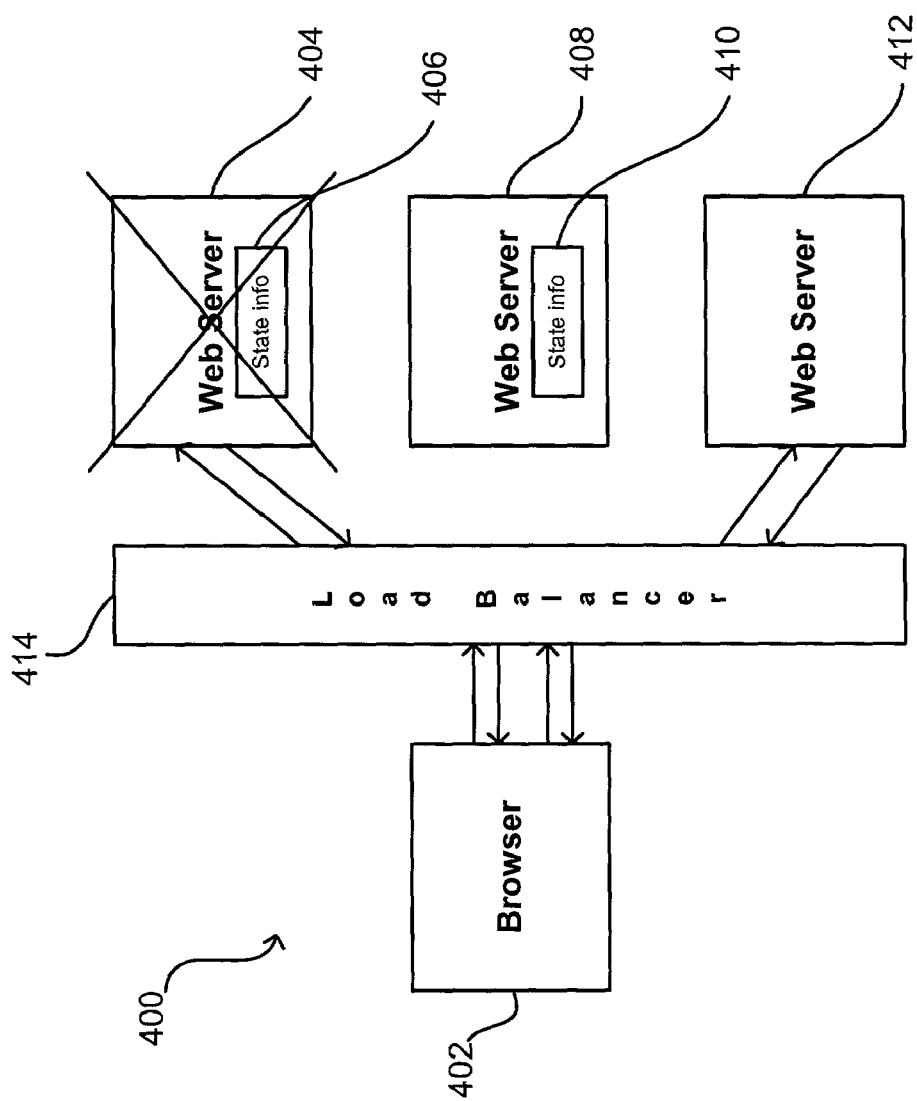
FIG. 4 is a diagram of a load balancer system in accordance with one embodiment of the present invention.

A hardware load balancer can be used to proxy certain types of requests to specific servers or server clusters, depending on whether the request requires dynamic page generation or whether the request is for a static page. In FIG. 4, a load balancer 414 is shown between the web browser 402 and the web servers 404, 408, 412.

While it may be desirable to optimize a hardware load balancer 414 for use with the present invention, it may be undesirable to require physical changes to the load balancer itself. It may also be undesirable for a hardware load balancer to have to read cookies and figure out that if the first primary 404 fails, the request needs to be redirected to the secondary server 408 indicated in the cookie stored on the browser 402. It may, however, be desirable to have the load balancer direct the request where the load balancer wants, and then make sure the system recovers appropriately.

In one such approach, the hardware load balancer 414 tends to send requests from a browser 402 or client to one server, based on some arbitrary information stored in the cookie on the web browser. For example, a cookie can have an initial string of information, followed by a segment of information related to the primary and secondary servers, as well as a session identifier used for replication. The hardware load balancer 414 can be configured to look only at this segment of information. If this segment of information does not change between successive cookies, the load balancer may keep redirecting the requests back to the primary server 404. Such "session stickiness" can also be based on other appropriate schemes, such as may utilize the IP address of the client.

The segment of information in the cookie can remain the same as long as the requests can go back to the primary server. If the primary server fails for any reason, the second server can assign itself to be the new primary server. The new primary server can then insert new information in the segment for a new secondary server, which can be selected by the new primary server or load-balancing mechanism. Alternatively, the hardware load balancer can choose a new primary server and redirect the request to the new primary server.

The first request of a session that is received by the load balancer may not be hard coded to go to one server primarily. The decision to "stick" to one server can be made after the first request is made and comes back from the object server or other backend server. Hardware load balancers can be smart enough to do this "simple stickiness", or to return primarily to the assigned primary server with which the load balancer has a connection.

If no cookie exists, the hardware load balancer can be configured to use any of a number of load balancing methods, such as may be based on load or response time. The load balancer can then select a server, such as in the appropriate cluster, and direct the request to that server. When that primary server responds to the request, the server can send the browser a cookie containing the segment of information relating to the primary and secondary servers. Each subsequent request from that browser that is received by the hardware load balancer can have that cookie associated with it, such that the load balancer can associate that request with the primary server.

The system still may not be able to guarantee that a request will go to the primary server. As shown in FIG. 4, if a failure occurs at the primary server 404 and another request comes into the load balancer 414, the load balancer can simply make another load balancing decision and direct the request to another server 412. The request may not go to the second server 408. This approach is different from that described above for a plug-in approach, where the request can automatically go to the second server. In this way, a hardware load balancer is less "intelligent" than a special proxy plug-in, similar to those described above.

If the server 412 chosen by the load balancer 414 is not the second server 408, the chosen server 412 may realize that the request is a request on a session that it is not hosting. In this case, the chosen server 412 can look to the cookie in order to determine the secondary server 408.

Once the chosen server 412 has located the secondary server 408, the chosen server 412 can request session state information 410 from the secondary server 408. The chosen server 412 can then transform itself into the new primary server for the session. The secondary server 408 in this case can remain the same. The cookie is updated so the load balancer 414 will keep directing the requests to the new primary server 412.

In the event that the load balancer 414 chooses to direct the request to a new server that happens to be the secondary server 408, the secondary server can set itself as the new primary server and a new secondary server can be selected.

A system with a hardware load balancer having a servlet cluster behind it can provide a fast data path. If a web server does the routing, it may be necessary for the request to come up into the software where some code is executed, and then be sent back out onto the network. The load balancer/servlet cluster system does everything at a low, protocol level so it may be comparatively very fast.

It may be advantageous to have the load balancing algorithms as localized as possible. In the hardware load balancer case, it may only be necessary to ensure that the software on the server is operating properly, such as software that may be written in Java. In systems without a hardware load balancer, it may be necessary to make sure that each special plug-in of every web server in the system works as well.

It may also be necessary to support plug-ins for different platforms. A hardware load balancer can work equally well with systems based on differing platforms, such as a Netscape Application Server (NAS), WebLogic Server™ (WLS), Microsoft® Internet Information Server (IIS), or Apache HTTP Server. With the hardware load balancer, the system can be reduced by one level of complexity, as one of the banks may be removed. This is shown in FIG. 4, where the web server and servlet engine are in the same process.

Some of the systems described above can utilize servlets for web access. A similar mechanism can be used for accessing stateful session beans, a type of Enterprise Java bean ("ejb"). While servlets can be used to service requests from browser clients, ejb servers can be used to support requests from Java clients.

With Java clients, there can be a single, persistent connection for the entire duration of a session. There may then be no need (or support) for cookies. Also, since a persistent connection exists, there may no longer be a need for a load balancer. A Java client can connect to one of the backend servers using, for example, DNS or a load balancer. The Java client can then look up a "handle" to a stateful session. A handle in Java is similar to a pointer, which may be used to locate the appropriate session.

Figure 5:
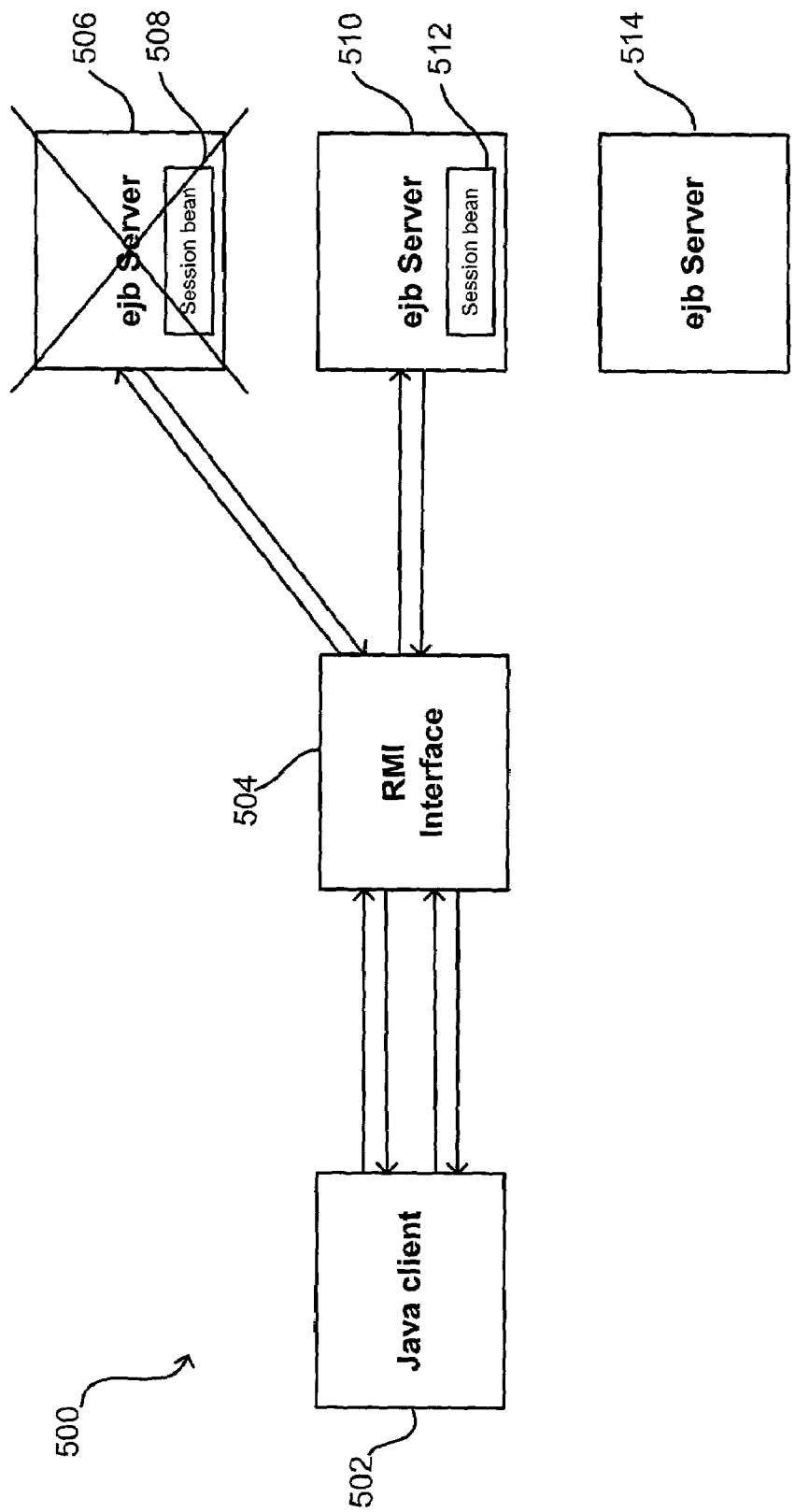
FIG. 5 is a diagram of a Java system in accordance with one embodiment of the present invention.

Referring to the system 500 of FIG. 5, once a Java client 502 is connected to a handle, the stateful session bean 510 can be created. The stateful session bean 510 can be used to handle the caching or storing of information for the session. When the stateful session bean is created, the server housing the bean can become the primary server 508, to which the Java client 502 can make requests. The primary server 506 can then choose a secondary server 512. The secondary server 510 can also have a stateful session bean 512 to cache or store the session information.

The stateful session bean 508 can pass this information back to the Java client 502, similar to sending a cookie, using an RMI (Java Remote Method Invocation) protocol. Extra information can be placed "on top" of the standard RMI in order to make this cookie simulation work, similar to the way transaction context propagation works. The primary/secondary server identifier pair can be passed back to the Java client 502 with every response. Each time the Java client 502 makes a call, it can call through an interface 504 into special RMI code adapted to continue to make calls to the primary server 506 for that session. If the primary fails, the Java client 502 can look at the information regarding the location of the secondary server 510, and can instead make a request to the secondary server. It may be preferable, for efficiency, if only the essential information regarding server identification is passed back on top of the RMI.

The Java client 502 may always know which server is the secondary server 510. The Java client can have much of the same logic that a proxy might have, such as always knowing to go to the secondary server 510 if the primary server 506 is unavailable. The Java client can monitor server health in order to avoid sending requests to unavailable servers. In the event that the secondary server 510 becomes the new primary server, a new secondary server 514 can still be chosen. The logic for selecting a new primary and/or secondary server can be similar to that described above. The Java client can immediately update to the new primary/secondary servers.

Figure 6:
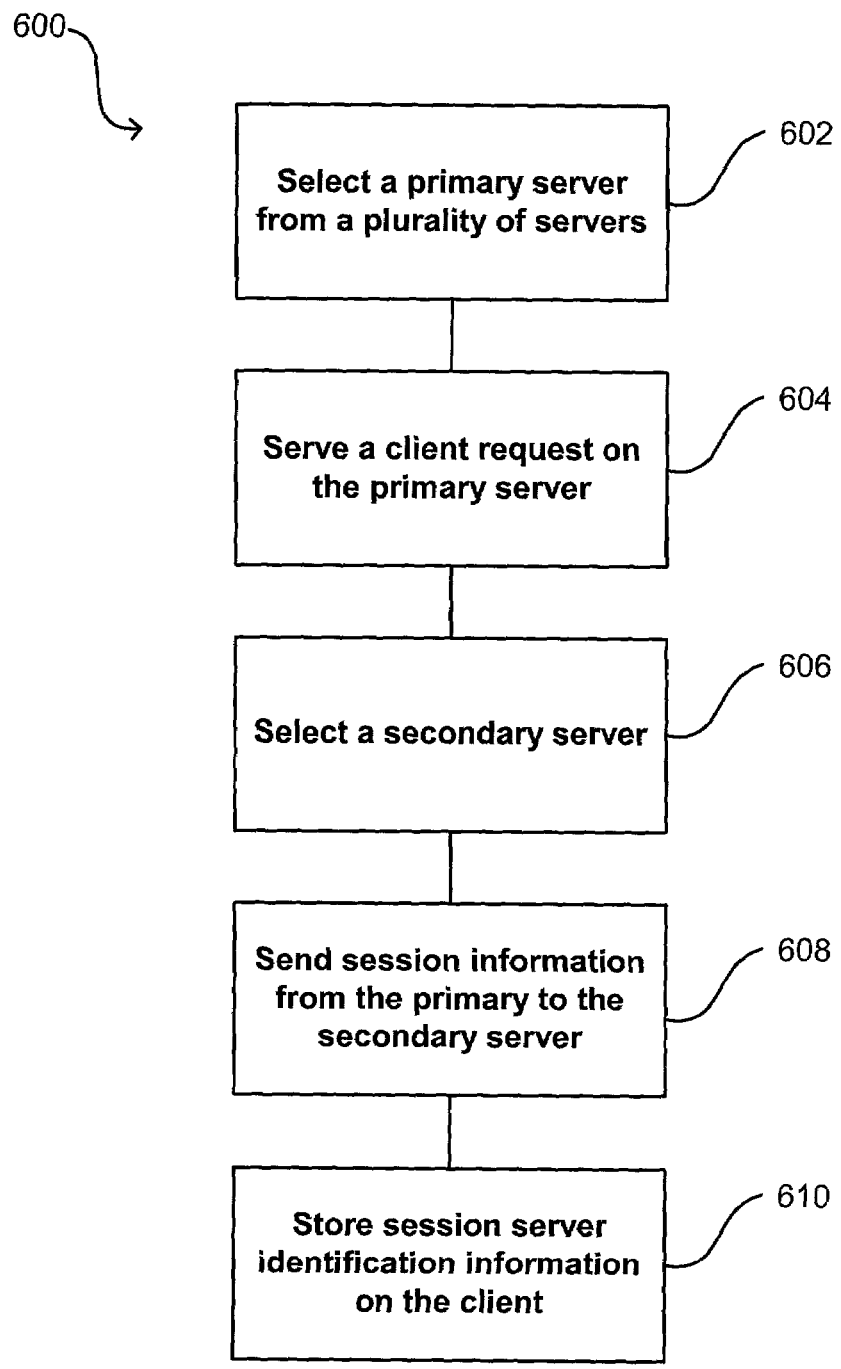
FIG. 6 is a flowchart for a process in accordance with one embodiment of the present invention.

In accordance with the above discussion, systems in accordance with the present invention can generally follow one of two branching paths, although variations including those mentioned above may be utilized. A common part of such a path is shown in FIG. 6. In the process 600 of FIG. 6, a primary server is selected from a group of servers 602. Once a primary server is selected, the client request is served on that primary server 604. A secondary server is then chosen 606, possibly by the primary server. The session information is then sent from the primary to the secondary server 608. Information identifying the primary and secondary servers can be stored on the client 610, such as may be stored in a cookie or passed on top of standard (or other) RMI.

Figure 7:
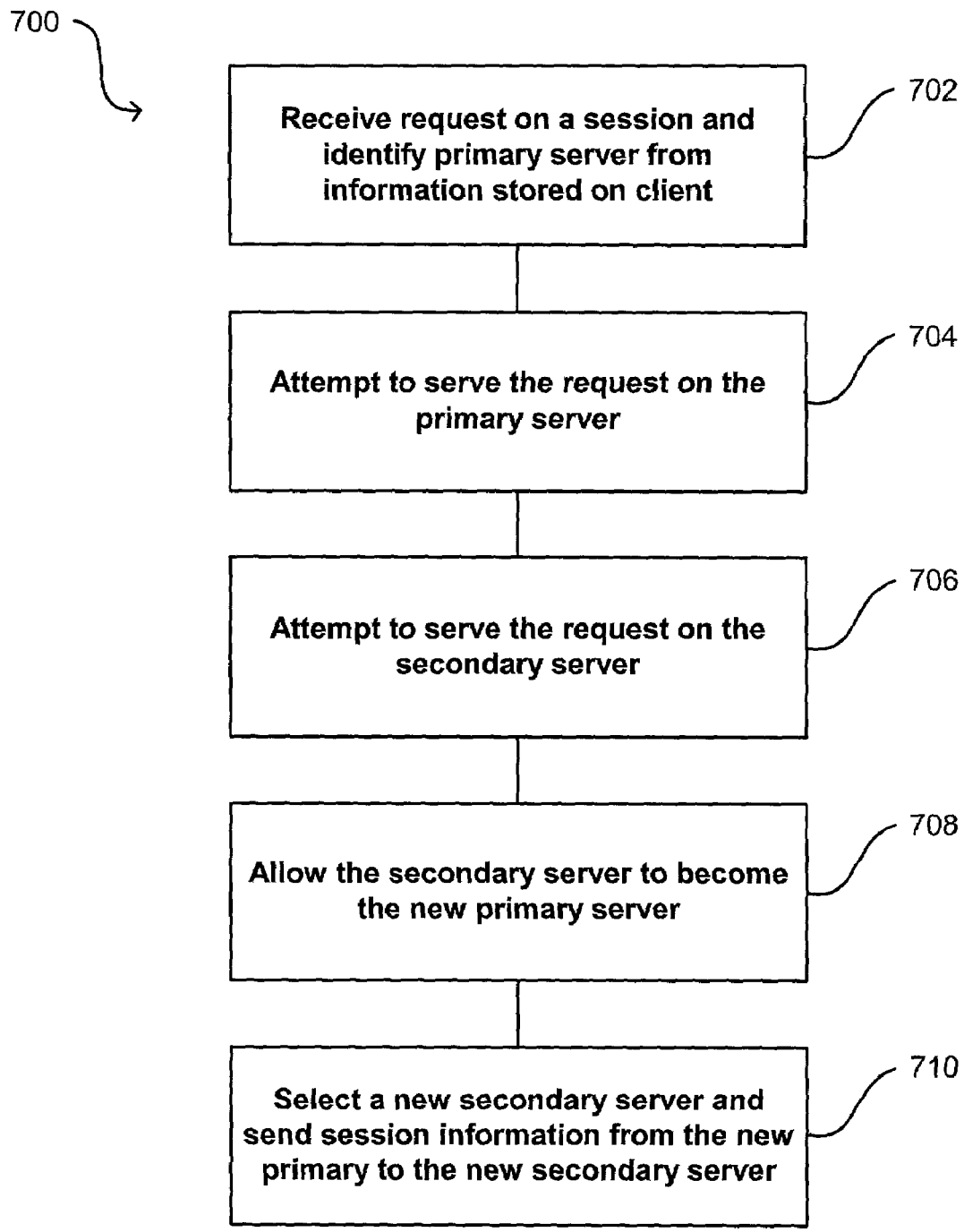
FIG. 7 is a flowchart for a software load balancer process in accordance with one embodiment of the present invention.

From this point, the process branches off into a path that can be useful for software load balancing, and a process that can be useful for hardware balancing. FIG. 7 shows a process 700 useful for software load balancing. In the process 700, a request is received on a session for which a primary and secondary server have already been selected, and the identification of the primary is garnered from the information stored on the client 702. An attempt is then made to serve the request on the primary server 704. If the primary is unable to serve the request, the request is served on the secondary server 706. Once the secondary server receives the request, the secondary server becomes the new primary server 708. A new secondary server is then selected and sent the session information from the new primary server 710.

Figure 8:
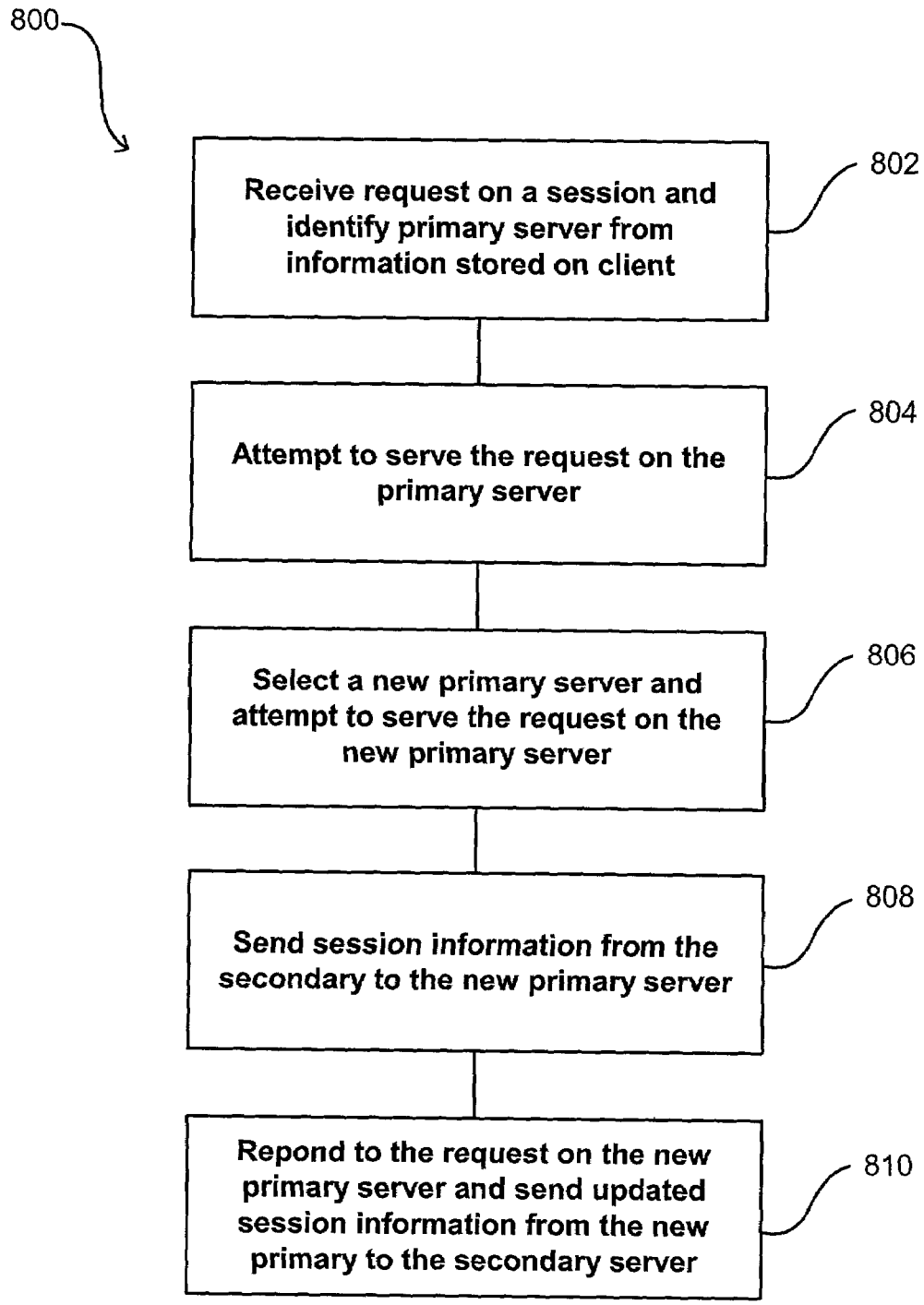
FIG. 8 is a flowchart for a hardware load balancer process in accordance with one embodiment of the present invention.

Another path, useful for systems with hardware load balancers, is shown in FIG. 8. In the process 800 of FIG. 8, a request is received on a session for which a primary and secondary server have already been selected, and the identification of the primary server is garnered from the information stored on the client 802. An attempt is then made to serve the request on the primary server 804. If the primary server is unable to serve the request, the hardware load balancer selects a new primary server and attempts to server the request on the new primary server 806. The session information is then sent from the secondary server to the new primary server 808, such as in response to a request from the new primary. The new primary server may then respond to the request, and send updated session information to the secondary server 810.

To maintain the consistency in any embodiment of the present invention, a change in session data can be associated with a version number. The primary and secondary servers may each know which version of the session it is storing. A server can be instructed to modify the data only if it receives a request that has a version number later, or higher, than the one it is currently storing. The primary and secondary servers can periodically check each other to ensure that they are both on the same version number. The version number can use a method as simple as incrementing a number to guarantee ordering. For session information to remain consistent, it may be desirable for the primary and secondary servers to be in synchronization. When a version number is out of synchronization, the primary server can choose to send the entire session information to the secondary server to bring the session back into synchronization. The synchronization also facilitates the ability of the servers to switch roles between primary and secondary if the need arises.

If the primary server is unable to update information on the secondary server, for reasons such as a bad connection, it may be possible that the primary server will keep updating and the secondary server will be unaware of any updates. It may then be possible for the primary server to be several versions ahead of the secondary server. Once the primary server is again able to send information to the secondary server, a delta between two successive versions may not work. In such a case, the primary server can send an entirely new set of session data to the secondary server in order to make the data session consistent across both servers. In this case, the secondary server either gets a delta between successive versions, or it gets all the data for the entire session. In other embodiments, it may be possible to generate a delta between arbitrary versions in order to bring the secondary server up to the current version.

In simulating cookies for tracking Java states, large random numbers can be used for server identification. The numbers can be large enough that it is highly unlikely that the sum of two different pairs of identification numbers will be the same. It may be possible to only send these two numbers back to the Java client, and the server pair can be identified by adding the two numbers together to get a new number. This allows the passing of only one number to identify two servers, which can improve efficiency. Since the Java client can have a persistent connection with a specific server, the client can identify the second server by subtracting the identification number of the primary server from the summed number being passed, in order to arrive at the identification number of the second server.

Java objects such as session beans may, however, be stateless or have a transient state, as opposed to the persistent state discussed above. If a Java session bean is stateless, the bean may not be able to maintain session information between invokes, or successive requests. If the session information is stored elsewhere, the stateless beans can load the session information temporarily in order to serve the request. Failover, or turning session control over to a new primary server having replicated session information, can only occur where there was a clean invoke failure, such as where the primary server never received the request, the request was transactional and was aborted, or was a one-time-only request. If the session bean is transient, on the other hand, instances can be created by a stateless factory with stateless load balancing and failover. The bean in a transient state may either not be backed up or may be backed up in-memory using primary/secondary replication as discussed above.

Batch updates can be used to improve the throughput of the system with an increased failure window. When batching, or "boxcarring," several requests are sent together as one large request in order to improve efficiency and scalability. The batching of requests can be based upon any of a number of criteria, such as time intervals or numbers of requests. For instance, a system can send a batch of requests every 10 seconds or for every 100 individual session update messages.

The system can also accommodate both criteria, sending a batch when either 10 seconds has passed since the last batch or when 100 requests are received, whichever comes first. Batching may cause the system to no longer be as reliable as synchronous updates, but can improve the overall system scalability.

The criteria may also be configurable, such as by a user or an administrator. Configurable criteria can be appropriate in situations where a system encounters a lot of traffic at certain times, but little to no traffic at other times. Configurable criteria can, for example, allow batching of every 100 messages at peak time, but no batching at all during off time, so that every request is sent in a reasonable amount of time.

A system administrator can also choose to pair two servers in a cluster as primary and secondary servers. The input of the administrator can be desirable in order to improve the overall fault tolerance of the system. For example, multiple servers can be located on one physical machine and an algorithm might choose to place both primary and secondary servers on the same machine. The session information could then be lost entirely if that machine fails. In order to prevent the loss of session information from machine failures, an administrator can choose to specify a primary server and a secondary server each on a separate physical machine. The administrator can also choose a primary server based on various load-balancing schemes. Examples of possible schemes are based on server load, connection number, and physical proximity.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system for replicating information in a client session, comprising:
   a. a primary server adapted to receive a request in a client session and serve a response to that request, said primary server further adapted to store session information for that client session;
   b. a secondary server adapted to receive request in a client session and serve a response to that request, said secondary server storing session information for that client session concurrently with the primary server; and
   c. a web server adapted to receive a request from a client, the request containing identification information for said primary and secondary servers, the web server adapted to process the identification information and serve the process request on said primary server, the web server further adapted to serve the request on said secondary server if said primary server is unable to process the request wherein the client session information is sufficient for the secondary server to maintain the client session;
   wherein the session information allows the primary or secondary server to provide client specific responses to client requests, the session information allowing the primary or secondary server to continue a previously started internet session by serving the response to the request using client session data from the session information.

2. A system according to claim 1, further comprising a database in communication with said primary and secondary servers, said database storing information useful in processing the request.

3. A system according to claim 1, wherein said primary server is further adapted to update the session information stored in said second session server each time said primary server receives a request for that client session.

4. A system according to claim 1, wherein said web server is further adapted to choose said primary server from a plurality of servers when an initial request is received for the client session and no identification information exists on the client.

5. A system according to claim 1, further comprising a cookie adapted to be stored on the client, said cookie adapted to contain the identification information for said primary and secondary servers.

6. A system according to claim 5, wherein said primary server is further adapted to generate said cookie on the client.

7. A system according to claim 1, wherein said web server further comprises a plug-in containing an algorithm to be used in choosing said primary server.

8. A system according to claim 1, wherein said web server further comprises a plug-in containing an algorithm to be used in directing the request to said primary and secondary servers.

9. A system according to claim 7, wherein said algorithm is a load-balancing algorithm.

10. A system according to claim 1, wherein said primary server is adapted to select said secondary server.

11. A system according to claim 1, wherein said primary server is adapted to start the client session when receiving an initial request from the client.

12. A system according to claim 1, wherein said secondary server is further adapted to become the new primary server if the secondary server receives a request that could not be processed by said primary server.

13. A system according to claim 12, wherein said secondary server is further adapted to select a new secondary server and send the session information to the new secondary server.

14. A system according to claim 12, wherein said web server chooses a new secondary server.

15. A system according to claim 1, wherein said secondary server is further adapted to monitor said primary server to determine if said primary server may receive requests.

16. A system according to claim 1, wherein said secondary server is further adapted to become a new primary server if said primary server is unable to receive requests.

17. A system according to claim 1, wherein one of said primary and secondary servers is selected from the group consisting of web servers, servlet engines, and enterprise Java bean engines.

18. A system for replicating information in a Java client session, comprising:
   a. a primary server adapted to receive a request from a Java client in a client session and serve a response to that request, said primary server further adapted to store session information for that client session;
   b. a secondary server adapted to receive request in a client session and serve a response to that request, said primary server storing session information for that client session concurrently with the primary server; and
   c. a stateful session bean on the primary server used to store information for the client session and pass the identity of said primary and secondary servers back to the client wherein the client session information is sufficient for the secondary server to maintain the client session;

wherein the session information allows the primary or secondary server to provide client specific responses to client requests, the session information allowing the primary or secondary server to continue a previously started internet session by serving the response to the request using client session data from the session information.

19. A system according to claim 18, further comprising a load balancer adapted to receive a request from a client and select said primary server.

20. A system according to claim 18, wherein said primary server is adapted to maintain a persistent connection with the Java client during the client session.

21. A system according to claim 1, wherein said web server is further adapted to send requests to said primary server in batches.

22. A method for providing redundancy in a client session, comprising:
 a. making a load balancing decision for an initial request from a client in a client session in order to select a primary server from a plurality of session servers;
 b. serving said request on said primary server;
 c. selecting a secondary server;
 d. sending session information for that client session from the primary server to the secondary server; and
 e. updating session information on the primary and secondary servers each time a request is received in the client session wherein the client session information is sufficient for the secondary server to maintain the client session;
 wherein the session information allows the primary or secondary server to provide client specific responses to client requests, the session information allowing the primary or secondary server to continue a previously started internet session by serving the response to the request using client session data from the session information.

23. A method according to claim 22, further comprising: storing the information in a cookie on the client.

24. A method according to claim 22, further comprising: serving the request on the secondary server if the primary server is unable to process the request.

25. A method according to claim 24, further comprising: selecting a new secondary server.

26. A method according to claim 22, further comprising: serving requests to the primary server in batches.

27. A method according to claim 22, further comprising: sending session information for that client session from the primary server to the secondary server in batches.

28. A method according to claim 22, further comprising: storing session information in a stateful session bean.

29. A method according to claim 22, further comprising: associating a version number with each update to the session information in response to a request.

30. A method according to claim 22, wherein sending session information for that client session from the primary server to the secondary server comprises sending a delta of information containing the changes in the session information.

31. A method according to claim 22, further comprising: assigning the primary and secondary servers each an identification number.

32. A method according to claim 31, further comprising: adding the identification number for the primary and secondary servers to obtain one number that describes both the primary and secondary servers.

33. A system for replicating information in a client session, comprising:
 a. a plurality of session servers;
 b. a primary server in said plurality of session servers, said primary server adapted to receive a request in a client session and serve a response to that request, said primary server further adapted to store session information for that client session, and adapted to generate a cookie containing information relating to said primary server and transmit the cookie to the session client;
 c. a secondary server in said plurality of session servers selected by said primary server, said secondary server receiving the session information from said primary server and store the session information, the secondary server further adapted to receive a request in a client session and serve a response to that request; and
 d. a web server adapted to receive a request from a client, the request containing identification information for said primary and secondary servers, the web server adapted to process the identification information and serve the process request on said primary server, the web server further adapted to serve the request on said secondary server if said primary server is unable to process the request wherein the client session information is sufficient for the secondary server to maintain the client session;
 wherein the session information allows the primary or secondary server to provide client specific responses to client requests, the session information allowing the primary or secondary server to continue a previously started internet session by serving the response to the request using client session data from the session information.

34. A method for providing redundancy in a client session, comprising:
 a. making a load balancing decision for an initial request from a client in a client session in order to select a primary server from a plurality of session servers;
 b. serving said request on said primary server;
 c. sending session information for that client session from the primary server to a secondary server selected by said primary server;
 d. storing a cookie on the session client containing information identifying the primary and secondary servers; and
 e. updating session information on the primary and secondary servers each time a request is received in the client session;
 wherein the session information allows the primary or secondary server to provide client specific responses to client requests, the session information allowing the primary or secondary server to continue a previously started internet session by serving the response to the request using client session data from the session information.

35. A method according to claim 34, further comprising the step of reading identification information in a request received in the client session and serving the request on the primary server.

36. A system for replicating information in a client session, comprising:
   a. a plurality of session servers;
   b. a primary server in said plurality of session servers, said primary server adapted to receive a request in a client session and serve a response to that request, said primary server further adapted to store session information for that client session, and adapted to generate a cookie containing information relating to said primary server and transmit the cookie to the session client;
   c. a secondary server in said plurality of session servers selected by said primary server, said secondary server adapted to receive the session information from said primary server and store the session information, the secondary server further receiving a request in a client session and serve a response to that request; and
   d. a web server containing load-balancing logic for selecting said primary server, said web server adapted to receive an initial request from a client and direct that request to said primary server, said web server further adapted to receive a subsequent request from a client, the subsequent request containing identification information for said primary and secondary servers, the web server adapted to process the identification information and serve the process request on said primary server, the web server further adapted to serve the request on said secondary server if said primary server is unable to process the request wherein the client session information is sufficient for the secondary server to maintain the client session;
   wherein the session information allows the primary or secondary server to provide client specific responses to client requests, the session information allowing the primary or secondary server to continue a previously started internet session by serving the response to the request using client session data from the session information.

37. A method for providing redundancy in a client session, comprising:
   a. making a load balancing decision for an initial request from a client in a client session in order to select a primary server from a plurality of session servers;
   b. serving said request on said primary server;
   c. sending session information for that client session from the primary server to a secondary server selected by said primary server;
   d. storing a cookie on the session client, the cookie containing information identifying the primary and secondary servers;
   e. reading the identification information received with any subsequent request in the client session and serving that subsequent request on the primary server; and
   f. updating session information on the primary and secondary servers each time a subsequent request is served on the primary server for that client session wherein the client session information is sufficient for the secondary server to maintain the client session;
   wherein the session information allows the primary or secondary server to provide client specific responses to client requests, the session information allowing the primary or secondary server to continue a previously started internet session by serving the response to the request using client session data from the session information.

38. A method for providing redundancy in a client session, comprising:
   a. selecting a primary server from a plurality of session servers in response to an initial request from a client;
   b. serving said request on said primary server to begin a client session;
   c. selecting a secondary server;
   d. sending session information for that client session from the primary server to the secondary server; and
   e. updating session information on the primary and secondary servers each time a request is received in the client session wherein the client session information is sufficient for the secondary server to maintain the client session;
   wherein the session information allows the primary or secondary server to provide client specific responses to client requests, the session information allowing the primary or secondary server to continue a previously started internet session by serving the response to the request using client session data from the session information.

39. A method according to claim 38, further comprising: storing the information in a cookie on the client.

40. A method according to claim 38, further comprising: serving the request on the secondary server if the primary server is unable to process the request.

41. A method according to claim 40, further comprising: selecting a new secondary server.

42. A method according to claim 38, further comprising: serving requests to the primary server in batches.

43. A method according to claim 38, further comprising: sending session information for that client session from the primary server to the secondary server in batches.

* * * * *

UNITED STATES PATENT AND TRADEMARK OFFICE
CERTIFICATE OF CORRECTION

PATENT NO. : 7,409,420 B2  Page 1 of 1
APPLICATION NO. : 10/000708
DATED : August 5, 2008
INVENTOR(S) : Sam Pullara et al.

It is certified that error appears in the above-identified patent and that said Letters Patent is hereby corrected as shown below:

On the Title Page, Item (*) Notice should read

-- (*) Notice: Subject to any disclaimer, the term of this patent is extended or adjusted under 35 U.S.C. 154(b) by 242 days --

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,409,420 B2 | Page 1 of 1 |
| APPLICATION NO. | : 10/000708 | |
| DATED | : August 5, 2008 | |
| INVENTOR(S) | : Pullara et al. | |

It is certified that error appears in the above-identified patent and that said Letters Patent is hereby corrected as shown below:

On page 2, in column 2, under "U.S. Patent Documents", line 8, delete "Rawson, II" and insert -- Rawson, III --, therefor.

On page 2, in column 2, under "Other Publications", line 1, delete "Webogic" and insert -- Weblogic --, therefor.

On sheet 8 of 8, in Figure 8, Box 810, line 1, delete "Repond" and insert -- Respond --, therefor.

In column 4, line 7, delete "forte" and insert -- for the --, therefor.

In column 6, line 28, delete "may can" and insert -- can --, therefor.

In column 6, line 43, delete "hard wiring" and insert -- hardwiring --, therefor.

Signed and Sealed this

Twenty-third Day of March, 2010

David J. Kappos
*Director of the United States Patent and Trademark Office*